US005641569A

United States Patent [19]

Hayashida et al.

[11] Patent Number: 5,641,569
[45] Date of Patent: Jun. 24, 1997

[54] SELF-TACKY PACKAGING FILM

[75] Inventors: Haruo Hayashida, Chiba; Kazuo Kasabo; Kouichi Yanase, both of Ichihara, all of Japan

[73] Assignee: Sumitomo Chemical Company, Limited, Osaka, Japan

[21] Appl. No.: 501,141

[22] Filed: Jul. 11, 1995

[30] Foreign Application Priority Data

Jul. 13, 1994 [JP] Japan .................... 6-161546

[51] Int. Cl.$^6$ .............. B32B 27/16; B32B 27/32
[52] U.S. Cl. ............ 428/345; 428/516; 428/349
[58] Field of Search ................. 428/516, 349, 428/345; 427/207.1; 156/241, 244.11

[56] References Cited

U.S. PATENT DOCUMENTS

| | | | |
|---|---|---|---|
| 4,194,039 | 3/1980 | Mueller | 428/213 |
| 5,279,872 | 1/1994 | Ralph | 428/34.9 |
| 5,298,302 | 3/1994 | Boice | 428/516 X |
| 5,419,934 | 5/1995 | Wilson | 428/516 X |
| 5,443,895 | 8/1995 | Peiffer et al. | 428/516 X |
| 5,460,861 | 10/1995 | Vicik et al. | 428/516 X |
| 5,462,777 | 10/1995 | Hayashida et al. | 428/516 X |
| 5,474,820 | 12/1995 | Murschall et al. | 428/516 X |
| 5,478,617 | 12/1995 | Watanabe et al. | 428/516 X |

FOREIGN PATENT DOCUMENTS

| | | | |
|---|---|---|---|
| 1-24628 | 5/1989 | Japan | B32B 27/28 |
| 5-84826 | 4/1993 | Japan | B29C 61/06 |
| 5-254074 | 10/1993 | Japan | B32B 27/28 |
| 5-286087 | 11/1993 | Japan | B32B 27/08 |

*Primary Examiner*—Daniel Zirker
*Attorney, Agent, or Firm*—Sughrue, Mion, Zinn, Macpeak & Seas

[57] ABSTRACT

A self-tacky packaging film which comprises a multi-layer film comprising:

(A) two outermost, surface layers comprising a polyethylene based resin and (B) at least one core layer, between the layers (A), comprising a polypropylene based resin having a melting point of 140° C. or more, at least one side of the multi-layer film being irradiated with an ionizing radiation, is excellent in tackiness, a microwave oven suitability and "saw edge"-cutting characteristics and has an appropriate flexibility.

18 Claims, No Drawings

SELF-TACKY PACKAGING FILM

FIELD OF THE INVENTION

The present invention relates to a self-tacky packaging film comprising a polypropylene type resin and a polyethylene type resin, and more particularly to a self-tacky packaging film having improved tackiness, a microwave oven suitability and cutting characteristics and an appropriate flexibility.

BACKGROUND OF THE INVENTION

This kind of self-tacky packaging films are largely used in families, restaurants and hotels for packaging foodstuffs, and exhibit effects of preventing foodstuffs from an evaporation of water during a storage in refrigerator, an evaporation of water during a heating in a microwave oven, a diffusion of flavor or taste or getting scented with other odors during a storage, or getting dusty during a use for business. Particularly, the popularization of a microwave oven in the recent years has much promoted a demand of the use for these kinds of packaging films. That is, the films are used for tightly packaging food containers usually made of ceramics or glass for the purpose of preventing an evaporation of water and a loss of taste in a microwave oven.

The packaging films used for such purposes are required to be tightly adhesive to the containers and simultaneously to exhibit a good tackiness property between the films each other. Further, the packaging films must be small in thermal shrinkage and exhibit neither thermal fusion nor whitening in a microwave oven (hereinafter, these properties are referred to as "a microwave oven suitability").

As conventional self-tacky packaging films, those using polyvinylidene chloride, polyethylene or polyvinyl chloride as a main starting material are known.

However, the films made from polyvinylidene chloride are disadvantageous in that they show a great shrinkage when heated, and this type of films are more expensive than the other two types of films. On the other hand, the films prepared from polyethylene have a fault that perforations are readily formed when the films are brought to a high temperature in contact with an oily or fatty material such as edible meats, fried foods, etc. The films prepared from polyvinyl chloride have a problem that they show a whitening phenomenon when brought into contact with boiling hot water.

Accordingly, none of these conventional self-tacky films can be said to be satisfactory in the point of a microwave oven suitability.

Many of such self-tacky packaging films are furnished to users in the form of a film having a width of 20 to 45 cm and a thickness of 10 to 20 μm rolled on a core material made of paper or the like and placed in a case made of paper or the like. The film is withdrawn from the case to a desired length and cut out by means of a blade called "saw blade (edge)" fixed on the case, after which the cut-out film is used for sealing the opening of a food container or the cut section of a food, by utilizing the self-tacky property of the film itself.

As the saw edge used for cutting the film, a simple edge prepared by punching out an iron plate having a thickness of about 0.2 mm into a shape of saw is generally used. The case supporting the saw edge is usually a coated cardboard box having a basis weight of about 350–700 g/m$^2$, which is very low in stiffness.

It is demanded to cut the film with such a simple cutting mechanism without difficulty. Actually, however, the cutting sometimes takes place at a position apart from the case or the saw edge.

Films made of polyvinylidene chloride, polyvinyl chloride or polyethylene as starting material have hitherto been used. In the case of polyvinylidene chloride film, if a tear appears at some positions of the film at the time of cutting, the tear extends so as to cut the film not along the saw edge but slantingly. In the cases of polyvinyl chloride film and polyethylene film, the film shows a great elongation at the time of cutting which deteriorated sharpness of cutting.

Although the films mainly made of polyvinylidene chloride or polyvinyl chloride have an appropriate flexibility (in this specification, flexibility is expressed in terms of Young's modulus) and therefore they are successfully used as domestic wrapping films, these films contain a large quantity of chloride, due to which they produce chlorine gas upon incineration. Further, the large quantity of plasticizer present therein is harmful. For these reasons, these films cannot be said to be satisfactory in environment suitability.

Thus, as a self-tacky packaging film made mainly of polypropylene, Japanese Patent Publication KOKOKU No. (JP-B-) 58-46216 has proposed a film obtained by compounding polypropylene with a specified quantity of polyethylene, JP-B-63-63578 has proposed a film compounded with a specified quantity of a nucleating agent together with atactic polypropylene, rosin or the like, Japanese Patent Application KOKAI No. (JP-A-) 4-328144 has proposed a biaxially stretched film obtained by compounding a polypropylene type copolymer with a specified quantity of a surfactant, and JP-B-2-14935 has proposed a method for producing a self-tacky packaging film by stretching a resin composition containing a tackifier.

Further, JP-A-6-32952 has proposed a film composed mainly of 4-methylpentene-1.

However, there has never been obtained a self-tacky packaging film simultaneously satisfying tackiness, a microwave oven suitability and "saw edge"-cutting characteristics and having an appropriate flexibility.

SUMMARY OF THE INVENTION

The object of the present invention is to provide an inexpensive self-tacky packaging film excellent in tackiness, a microwave oven suitability and "saw edge"-cutting characteristics and appropriate in flexibility, a process for producing the same, and a process for imparting well-balanced tackiness, a microwave oven suitability, cutting characteristics and flexibility to a packaging film.

In view of the above-mentioned object, the present inventors have conducted extensive studies on a self-tacky packaging film superior in a microwave oven suitability and saw-edge cutting characteristics and having an appropriate flexibility. As a result, it has been found that a multi-layer film comprising: (A) two outermost, surface layers comprising a polyethylene type resin and (B) at least one core layer, between the layers (A), comprising a polypropylene type resin having a melting point of 140° C. or more, at least one side of the multi-layer film being irradiated with an ionizing radiation. Based on this finding, the present invention has been accomplished.

As the film or sheet which can be obtained by an irradiation of an ionizing radiation, JP-B-1-24628 has proposed a film improved in heat-sealability which can be obtained by irradiating electron beam to a film prepared by laminating ethylene/vinyl acetate copolymer on a substrate film, JP-A-5-84826 has proposed a heat-shrinkable film obtained by irradiating an ionizing radiation to a sheet or a tube made of a polyethylene type resin composition, followed by a stretching treatment, JP-A-5-254074 has proposed a heat-shrinkable film obtained by irradiating electron beam to a multi-layer film made of polyethylene type resin, and JP-A-5-286087 has proposed a film or a tube including a radiation-degradational resin layer obtained by irradiating electron beam to a film containing a radiation energy-absorber in a radiation-degradational resin layer. However, a self-tacky packaging film obtained by an irradiation of an ionizing radiation has never been proposed so far.

Thus, the present invention provides a self-tacky packaging film which comprises a multi-layer film comprising:

(A) two outermost, surface layers comprising a polyethylene type resin, and (B) at least one core layer, between the layers (A), comprising a polypropylene type resin having a melting point of 140° C. or more, at least one side of the multi-layer film being irradiated with an ionizing radiation.

a process for producing a self-tacky packaging film comprising a multi-layer film, which comprises the steps of:

(a) making a polyethylene type resin and a polypropylene type resin having a melting point of 140° C. or more into a multi-layer film comprising (A) two outermost, surface layers comprising the polyethylene type resin, and (B) at least one core layer, between the layers (A), comprising the polypropylene type resin and (b) irradiating an ionizing radiation to at least one side of the surface layers (A), a process for imparting well-balanced tackiness, a microwave oven suitability, cutting characteristics and flexibility to a packaging film, which comprises the steps of:

(a) selecting as the packaging film, a multi-layer film comprising (A) two outermost, surface layers comprising a polyethylene type resin, and (B) at least one core layer, between the layers (A), comprising a polypropylene type resin having a melting point of 140° C. or more and (b) irradiating an ionizing radiation to at least one side of the surface layers (A), and a use of a self-tacky packaging film, wherein the packaging film is applied for tightly packaging food containers, which comprises a multi-layer film comprising: (A) two outermost, surface layers comprising a polyethylene type resin, and (B) at least one core layer, between the layers (A), comprising a polypropylene type resin having a melting point of 140° C. or more, at least one side of the multi-layer film being irradiated with an ionizing radiation.

The present invention relates to a self-tacky packaging film having satisfactory tackiness, a microwave oven suitability and "saw edge"-cutting characteristics and an appropriate flexibility, which can be obtained by irradiating an ionizing radiation to at least one side of surface layers (A) of a multi-layer film comprising: (A) two outermost, surface layers comprising a polyethylene type resin, and (B) at least one core layer, between the layers (A), comprising a polypropylene type resin having a melting point of 140° C. or more. By irradiating an ionizing radiation to the multi-layer film, the polyethylene type resin constituting the two outermost, surface layers undergo a crosslinking reaction in the hitherto known manner, due to which the apparent heat resistance improves and a good microwave oven suitability is obtained. The surface layers show a tackiness at the stage of film making. According to a study of the present inventors, this tackiness is not deteriorated by the irradiation of an ionizing radiation, but rather improved by the irradiation. On the other hand, the polypropylene type resin having a melting point of 140° C. or more located between the layers (A) tends to be degraded and embrittled by the irradiation of an ionizing radiation. Although this property may generally be taken as an undesirable tendency deteriorating the film properties, the present inventors have found that this property is useful for imparting a "saw-edge"-cutting property to the film without deteriorating the heat resistance which is inherent to a polypropylene type resin. Further, it is possible to realize an appropriate flexibility through a selection of the thickness ratio between layers.

DETAILED DESCRIPTION OF THE INVENTION

Next, the present invention is explained in more detail below.

The polyethylene type resin which can be used in the present invention includes, for example, low-density polyethylene, medium-density polyethylene and high-density polyethylene; and further includes copolymers of ethylene and α-olefins having from 4 to 10 carbon atoms such as ethylene-propylene copolymer, ethylene-butene-1 copolymer, ethylene-4-methylpentene-1 copolymer, ethylene-hexene-1 copolymer, ethylene-octene-1 copolymer, ethylene-decene-1 copolymer and the like; and ethylene copolymers containing other unsaturated comonomer components such as conjugated dienes, non-conjugated dienes and the like. Acid-modified derivatives of these polymers are also included, of which examples are the polymers graft-modified with α,β-unsaturated carboxylic acids, alicyclic carboxylic acids or derivatives thereof.

When a polyethylene, namely a homopolymer of ethylene, is used as said polyethylene type resin, said polyethylene type resin is preferably low-density polyethylene having a density of 0.935 g/cm$^3$ or less and a melt flow rate of from 0.1 to 50 g/10 minutes from the viewpoint of obtaining an appropriate tackiness. The density of the low-density polyethylene more preferably falls within the range of from 0.910 to 0.935 g/cm$^3$ and most preferably falls within the range of from 0.920 to 0.930 g/cm$^3$.

When a copolymer of ethylene and an α-olefin having from 4 to 10 carbon atoms is used as said polyethylene type resin, those having a density of from 0.88 to 0.94 g/cm$^3$ and a melt flow rate of from 0.1 to 50 g/10 minutes are preferable from the viewpoint of obtaining an appropriate tackiness. As for the α-olefin content, those having an α-olefin content of from 1 to 30% by weight are preferable.

The polypropylene type resin is not limited in the kind thereof, so far as melting point thereof is 140° C. or more. Polypropylene type resins of which melting point is lower than 140° C. are not suitable for the purpose of the present invention, because such polypropylene type resins give a film insufficient in heat resistance.

The polypropylene type resin which can be used in the present invention includes not only propylene homopolymer, but also a copolymer of propylene and one or more kinds of α-olefins other than propylene such as ethylene, butene-1, hexene-1 and the like. Said copolymer may be any of random copolymer and block copolymer.

Further, the polypropylene type resin used in the present invention may be any of a single resin and a mixture thereof.

In producing the film from the polypropylene type resin and polyethylene type resin in the present invention, conventionally employed additives may be incorporated into the film. That is, an antioxidant, a stabilizer, an antistatic agent, an antifogging agent, and the like may be incorporated arbitrarily.

According to the present invention, the multi-layer film is produced by making the polyethylene type resin and the polypropylene type resin into films by the method of co-extrusion T-die method, co-extrusion inflation method or the like. The films thus obtained may be stretched, if desired. The irradiation of the ionizing radiation may be carried out either in the process of production in an "in-line" manner or in other process in an "off-line" manner.

As the ionizing radiation, α-ray, β-ray, γ-ray and electron beam can be referred to, for example. Of these radiations, electron beam is preferable from the viewpoint of controllability and workability of the apparatus.

Usually, the ionizing radiation is irradiated to the multi-layer film at an exposed (exposure) dose of from about 1 to about 30 Mrad and preferably from about 3 to about 20 Mrad, and at an accelerating voltage of from 100 to 300 kV and preferably from 150 to 200 kV. The radiation is usually irradiated once at a selected (an intended) exposed dose. The radiation may be irradiated two or more times for totally being irradiated at a selected exposed dose. By irradiating to only one side of the multi-layer film, effects which result from the irradiation are attained also in an entire film towards an opposite side of the multi-layer film in view of the property that the ionizing radiation is transmitted through an object. Accordingly, the radiation may be irradiated either to one side or to both sides of the multi-layer film so as to be irradiated at a selected exposed dose.

Overall thickness of the film of the present invention is 50 μm or less and preferably in the range of from 8 to 15 μm. A thickness of only polypropylene type resin layer in the film is preferably in the range of from 10 to 90% based on the overall thickness.

Layers in the film of the present invention are constituted as follows. Fundamentally, the film of the present invention is constituted from three layers, namely polyethylene type resin layer/polypropylene type resin layer/polyethylene type resin layer. If necessary, however, a layer of other composition such as a layer of a regenerated resin, a layer of a gas barrier resin or the like may be additionally provided between the two outermost, surface layers of the polyethylene type resin to form a constitution of four or more layers.

Next, the present invention is explained in more detail with reference to examples. The present invention is by no means limited by these examples unless its essentiality is exceeded.

EXAMPLES

The methods for measurements of properties mentioned in the examples were as follows.

(1) Differential scanning calorimetric (DSC) measurement

Melting point of polypropylene type resin was measured with DSC-7 type equipment manufactured by Perkin Elmer Co. A sheet having a thickness of about 0.5 mm was prepared from a polypropylene type resin by means of hot press, from which a test piece weighing about 10 mg was cut out. The test piece was placed in a sample pan for DSC measurement. After elevating the temperature to 230° C., the temperature was lowered to 150° C. Then, the temperature was lowered from 150° C. to 40° C. at a cooling rate of 5° C./minute. After maintaining the test piece at 40° C. for 5 minutes, it was heated up to 180° C. at a heating rate of 5° C./minute to obtain a thermogram. The main peak temperature in the thermogram at the time of the temperature elevation was taken as a melting point.

(2) Density

Density of polyethylene type resin was measured according to the method prescribed in JIS K6760. After annealing a sample in water at 100° C. for one hour, density of the sample was measured.

(3) Melt flow rate (MFR)

MFR of polyethylene type resin was measured according to the method prescribed in JIS K6760.

MFR of polypropylene type resin was measured according to the method prescribed in JIS K6758.

(4) Comonomer content in copolymer

The content of comonomer in ethylene-butene-1 copolymer was determined by measuring the absorbance at 770 $cm^{-1}$ by means of an infrared spectrophotometer and referring to calibration curve.

(5) A microwave oven suitability

According to the Regulations Governing the Organization of Tokyo Metropolis No. 1072 "Quality indication of wrap films", a long strip film sample having a width of 3 cm and a length of 14 cm was grasped with jigs at the positions of 2.5 cm distant from the upper and lower ends, and a weight of 10 g was hung down from the lower end. The highest atmospheric temperature, at which the film kept unbroken even after a lapse for one hour under the above-mentioned condition, was measured, and expressed in ten degrees. A higher value of this temperature means a better microwave oven suitability.

(6) Adhesive power

A test piece film having a width of 10 cm and a length of 15 cm was tightly contacted with a 10 cm×10 cm glass plate, and a load of 500 g was applied to the film at 23° C., 50% RH (relative humidity) for 30 minutes. Then, one longitudinal end of the film was tightly grasped with a jig and pulled up perpendicularly from the glass plate at a rate of 200 mm/minute. The force required for the pulling up was measured and expressed in terms of g/10 cm, and taken as adhesive power.

(7) Young's modulus

According to the method prescribed in ASTM D882, both MD (machine direction) and TD (transverse direction) were measured. A smaller value of them means a higher flexibility, provided that:

shape of test piece: a long strip of 20 mm×120 mm chuck distance: 50 mm pulling speed: 5 mm/minute.

(8) Elongation at break

Measured according to JIS K6781.

(9) Thermal shrinkage factor

After revealing MD and TD of a film, the film was cut into a size of 9 cm square. The film was dipped in a silicone oil bath kept at 140° C. for 5 seconds and withdrawn, after which dimension of the film was measured. The percent shrinkage of the film was taken as thermal shrinkage factor (%).

(10) Haze

Measured according to ASTM D1003. A smaller value of haze means a higher transparency.

(11) Saw edge-cutting property

A test film was rolled on a core tube, introduced into a saw-edged case prepared by attaching a saw edge (an iron plate having a thickness of 0.2 mm punched into a form of saw) to a case made of a coated cardboard having a basis weight of 500 g/m², and tried to cut with the saw edge. A sample which could be cut straightly by merely contacting the sample with the saw edge and lightly pulling it was evaluated as "good" in cutting property; while a sample which was cut either slantingly or a sample with a great elongation of film, with deformation of the edge, or with a great cutting force was evaluated as "not good" in cutting property.

Example 1

As a resin (B) for constituting the polypropylene type resin layer, polypropylene (MFR=3.5 g/10 minutes; melting point=161° C.; Noblen WF452 manufactured by Sumitomo Chemical Industry Co., Ltd.) was used. As polyethylene type resin (A) constituting the two outermost, surface layers, ethylene-butene-1 copolymer (MFR=2.0 g/10 minutes; density=0.905 g/cm$^3$; butene-1 content=9% by weight; Esprene SPO N0352 manufactured by Sumitomo Chemical Industry Co., Ltd.) was used. According to the co-extrusion T die method, these resins were formed into a multi-layer film having a layer constitution of (A)/(B)/(A) and a thickness constitution of 2 μm/8 μm/2 μm. The extruder used for making the intermediate layer was a ϕ 90 mm extruder, and that used for making both sides of the surface layers was a ϕ 65 mm extruder, both manufactured by Mitsubishi Heavy Industries, Ltd. The die temperature was 260° C., the chill roll temperature was 20° C., and the working speed was 100 m/minute.

Then, electron beam was irradiated, only once, to one side of the film thus obtained, by means of an electron beam irradiating apparatus (Model CB200/145/300, manufactured by Iwasaki Electric Co., Ltd.) under the conditions of an accelerating voltage of 150 kV and an exposed dose of 20 Mrad. The inner atmosphere of the irradiating apparatus was nitrogen gas.

The results of evaluation are shown in Table 1.

Example 2

A multi-layer film was prepared in the same manner as in Example 1, except that thickness constitution of the multi-layer film was 1.5 μm/9 μm/1.5 μm.

Then, electron beam was irradiated to the film thus obtained, in the same manner as in Example 1.

The results of evaluation are shown in Table 1.

Comparative Example 1

A multi-layer film was prepared in the same manner as in Example 1, except that electron beam was not irradiated.

The results of evaluation are shown in Table 1.

Comparative Example 2

A monolayer film was prepared by extruding a polypropylene (MFR=3.5 g/10 minutes; melting point=161° C.; Noblen WF452 manufactured by Sumitomo Chemical Industry Co., Ltd.) by T die method.

Then, electron beam was irradiated to the film thus obtained, in the same manner as in Example 1.

The results of evaluation are shown in Table 1.

TABLE 1

|  | Example | | Comparative Example | |
| --- | --- | --- | --- | --- |
|  | 1 | 2 | 1 | 2 |
| A microwave oven suitability *1 | 150 | 150 | 150 | 150 |
| Adhesive power (g/10 cm) *2 | 20 | 18 | 10 | 0 |
| Young's modulus |  |  |  |  |
| MD (kg/cm$^2$) | 8,300 | 8,600 | 6,800 | 8,600 |
| TD (kg/cm$^2$) | 5,300 | 5,600 | 6,300 | 6,200 |
| Elongation at break (MD %) | 20 | 20 | 410 | 20 |
| Thermal shrinkage factor (MD/TD %) *3 | 2/0 | 2/0 | 1/0 | 2/0 |
| Haze (%) | 1.0 | 0.9 | 1.0 | 2.3 |
| Saw edge-cutting property | Good | Good | Not good | Good |

*1 According to the Regulations Governing the Organization of Tokyo Metropolis No. 1027
*2 90° peeling test on glass plate
*3 Heating at 100° C.

As has been detailed above, the self-tacky packaging film of the present invention is excellent in tackiness, a microwave oven suitability and "saw edge"-cutting characteristics, appropriate in flexibility, excellent in transparency and good in appearance.

Further, the self-tacky packaging film of the present invention is much superior in environment suitability to the films made mainly of polyvinylidene chloride or polyvinyl chloride.

Further, the self-tacky packaging film of the present invention is useful as packaging films such as domestic wrapping film, industrial wrapping film, etc.

What is claimed is:

1. A self-tacky packaging film which comprises a multi-layer film comprising:
    (A) two outermost, surface layers consisting essentially of either (a) a low-density polyethylene having a density of 0.935 g/cm$^3$ or less and a melt flow rate of from 0.1 to 50 g/10 minutes or (b) a copolymer of ethylene and an α-olefin having 4 to 10 carbon atoms and having a density of from 0.88 to 0.94 g/cm$^3$ and a melt flow rate of from 0.1 to 50 g/10 minutes, and
    (B) at least one core layer, between the layers (A), comprising a polypropylene based resin having a melting point of 140° C. or more, at least one side of the multi-layer film being irradiated with an ionizing radiation, at an exposed dose of from 3 to 30 Mrad and at an accelerating voltage of from 100 to 300 KV.

2. The self-tacky packaging film according to claim 1, wherein a source of said ionizing radiation is an electron beam.

3. The self-tacky packaging film according to claim 1, wherein said polypropylene based resin is selected from the group consisting of a propylene homopolymer, a copolymer of propylene and one or more kinds of α-olefins other than propylene, and mixtures thereof.

4. The self-tacky packaging film according to claim 1, wherein said self-tacky packaging film has a thickness of 50 μm or less.

5. The self-tacky packaging film according to claim 1, wherein said at least one layer comprising the polypropylene based resin (B) has a thickness of from 10 to 90% of the total thickness of the self-tacky packaging film.

6. A process for producing a self-tacky packaging film comprising a multi-layer film, which comprises the steps of:
    (a) forming a polyethylene based resin and a polypropylene based resin having a melting point of 140° C. or more into a multi-layer film comprising (A) two outermost, surface layers consisting essentially of either (a) a low-density polyethylene having a density of 0.935 g/cm$^3$ or less and a melt flow rate of from 0.1 to 50 g/10 minutes or (b) a copolymer of ethylene and an α-olefin having 4 to 10 carbon atoms and having a density of from 0.88 to 0.94 g/cm$^3$ and a melt flow rate of from 0.1 to 50 g/10 minutes, and (B) at least one core layer, between the layers (A), comprising the polypropylene based resin, and (b) irradiating an ionizing radiation to at least one side of the surface layers (A).

7. The process according to claim 6, wherein the step (b) includes a step of selecting electron beam as the ionizing radiation.

8. The process according to claim 6, wherein the step (a) includes a step of selecting the polypropylene type resin from the group consisting of a propylene homopolymer, a copolymer of propylene and one or more kinds of α-olefins other than propylene, and mixtures thereof.

9. The process according to claim 6, wherein the step (b) includes a step of irradiating the ionizing radiation at an exposed dose of from about 1 to about 30 Mrad and at an accelerating voltage of from 100 to 300 kV.

10. The process according to claim 6, wherein said self-tacky packaging film has a thickness of 50 μm or less.

11. The process according to claim 6, wherein said at least one layer comprising the polypropylene based resin (B) has a thickness of from 10 to 90% of the total thickness of the self-tacky packaging film.

12. A process for imparting well-balanced tackiness, a microwave oven suitability, cutting characteristics and flexibility to a packaging film, which comprises the steps of:

(a) forming as the packaging film, a multi-layer film comprising (A) two outermost, surface layers consisting essentially of either (a) a low-density polyethylene having a density of 0.935 g/cm$^3$ or less and a melt flow rate of from 0.1 to 50 g/10 minutes or (b) a copolymer of ethylene and an α-olefin having 4 to 10 carbon atoms and having a density of from 0.88 to 0.94 g/cm$^3$ and a melt flow rate of from 0.1 to 50 g/10 minutes, and (B) at least one core layer, between the layers (A), comprising a polypropylene based resin having a melting point of 140° C. or more, and (b) irradiating an ionizing radiation to at least one side of the surface layers (A).

13. The process according to claim 12, wherein the step (b) includes a step of selecting electron beam as the ionizing radiation.

14. The process according to claim 12, wherein the step (a) includes a step of selecting the polypropylene based resin from the group consisting of propylene homopolymer, a copolymer of propylene and one or more kinds of α-olefins other than propylene, and mixtures thereof.

15. The process according to claim 12, wherein the step (b) includes a step of irradiating the ionizing radiation at an exposed dose of from about 1 to about 30 Mrad and at an accelerating voltage of from 100 to 300 kV.

16. The process according to claim 12, wherein said self-tacky packaging film has a thickness of 50 μm or less.

17. The process according to claim 12, wherein said at least one layer comprising the polypropylene based resin (B) has a thickness of from 10 to 90% of the total thickness of the self-tacky packaging film.

18. A method of tightly packaging food containers with a self-tacky packaging film comprising a multi-layer film, which comprises the steps of:

(a) forming a polyethylene based resin and a polypropylene based resin having a melting point of 140° C. or more into a multi-layer film comprising (A) two outermost, surface layers consisting essentially of either (a) a low-density polyethylene having a density of 0.935 g/cm$^3$ or less and a melt flow rate of from 0.1 to 50 g/10 minutes or (b) a copolymer of ethylene and an α-olefin having 4 to 10 carbon atoms and having a density of from 0.88 to 0.94 g/cm$^3$ and a melt flow rate of from 0.1 to 50 g/10 minutes, and (B) at least one core layer, between the layers (A), comprising the polypropylene based resin; (b) irradiating an ionizing radiation to at least one side of the surface layers (A); and (c) applying said packaging film to food containers.

* * * * *